T. G. HOLLIS & S. GIBNEY.
FLOODING DEVICE FOR CHOCOLATE COATING MACHINES.
APPLICATION FILED FEB. 6, 1912.
1,029,124.
Patented June 11, 1912.
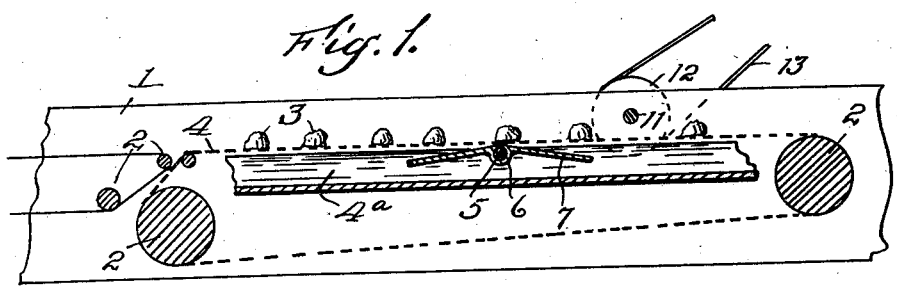
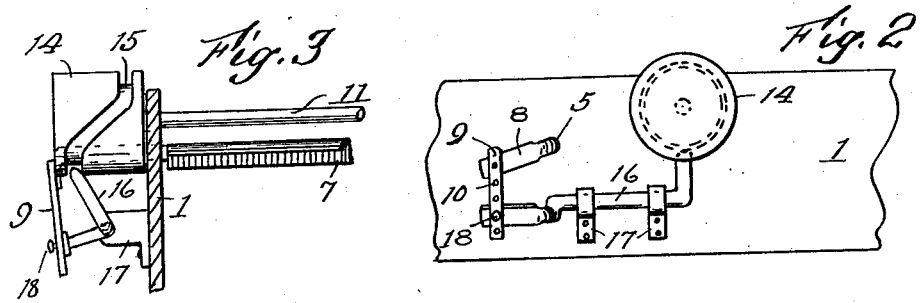
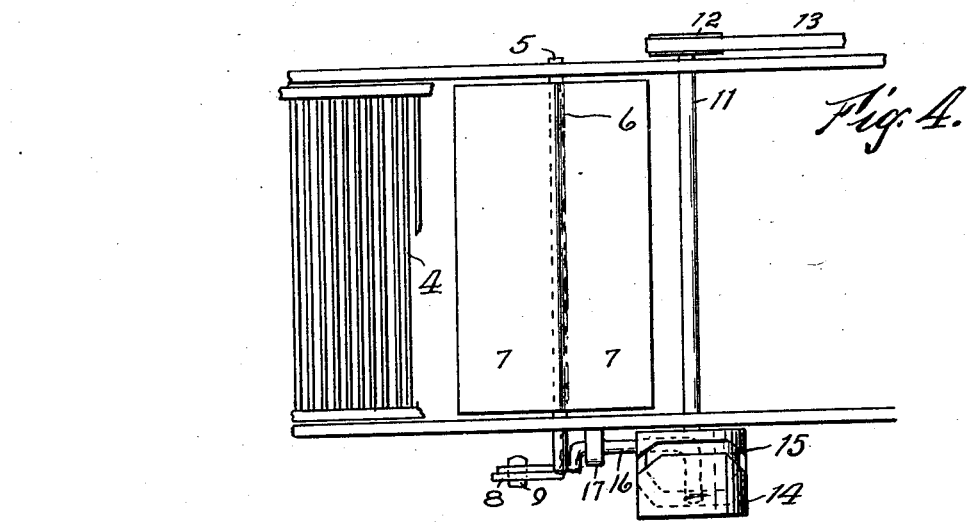
THAMOS G. HOLLIS
SAMUEL GIBNEY, Inventors

UNITED STATES PATENT OFFICE.

THAMOS G. HOLLIS AND SAMUEL GIBNEY, OF READING, PENNSYLVANIA, ASSIGNORS TO THE FIRM OF W. G. HOLLIS, OF READING, PENNSYLVANIA.

FLOODING DEVICE FOR CHOCOLATE-COATING MACHINES.

1,029,124.         Specification of Letters Patent.     Patented June 11, 1912.

Application filed February 6, 1912. Serial No. 675,751.

*To all whom it may concern:*

Be it known that we, THAMOS G. HOLLIS and SAMUEL GIBNEY, citizens of the United States, residing at Reading, in the county of Berks and State of Pennsylvania, have invented certain new and useful Improvements in Flooding Devices for Chocolate-Coating Machines, of which the following is a specification.

This invention relates to improvements in flooding devices for chocolate coating machines and the invention is adapted for use on machines in which confectionery is coated with liquid chocolate while passing through the machine on traveling belts or aprons.

In machines of this character, the chocolate is applied to the blanks in various ways, but the usual method is by permitting the liquid chocolate to fall upon the blanks and drain through the belt on which the blanks are placed. In these machines, devices such as shakers or other jarring devices have been employed to cause the under side or bottom surface of the blanks to acquire the proper coating of the chocolate.

In this present invention however, we have devised a flooding plate, mounted on a rod or shaft, for the purpose of flooding or coating the under surfaces of the blanks as they pass along on the belt. The plate is formed with two blades, depending slightly from the horizontal, and means is provided for giving to the plate an oscillating movement, so that the blades are alternately dipped into the mass of liquid chocolate and raised against the under surface of the perforated belt on which the blanks are located, thus insuring the proper coating of the blanks on the under surface.

The invention is more fully described in the following specification and clearly illustrated in the accompanying drawing, in which:—

Figure 1 is a longitudinal central sectional view of a portion of a chocolate coating machine of ordinary construction, in which the usual traveling belt is shown. Fig. 2 is a side elevation of this portion of the machine, showing the oscillating device. Fig. 3 is a side view of Fig. 2, showing a portion of the flooding plate. Fig. 4 is a plan view of a portion of the machine, with the traveling belt broken away to show the flooding plate.

The numeral 1 designates the body of the machine, a small portion only of which is shown, and 2 designates the rolls over which the traveling belts pass. These belts are adapted as usual, to carry the blanks 3 through the machine, during which passage they are coated with the liquid chocolate. This coating means may be of any of the well known forms, and we have not shown that portion of the machine, for the reason that the present invention consists entirely in the means for applying the liquid chocolate to the under surfaces of the blanks.

The numeral 4ª designates the chocolate pan, over which the belt 4 passes. In this pan, mounted on a rod 5 we secure a flooding device 6 in the form of a plate having two blades 7, one on each side of the rod, and each of which is bent downwardly from the horizontal, so that one of them is at all times in the liquid chocolate while the other is up against the belt 4. The rod 5 is provided at one end with a right angled end 8 to which is pivoted the upper end of a vertical bar 9, which bar is formed with a series of holes 10.

The numeral 11 designates a shaft, mounted in the machine frame, and provided with a power pulley 12 and a belt 13 at one end. To the other end, outside of the frame, is secured a cylindrical body 14 in the surface of which we form a peripheral groove 15 of irregular outline, adapted to act with a cam like movement on the end of a bar 16 which rests in said groove. This bar 16 is mounted on the side of the frame in supports 17 and the other extremity thereof is adjustably connected to the lower end of the vertical bar 9, and a removable pin 18 serves to hold the two members together, through one of the holes 10 in the bar 9; by this means we determine the movement of the rod 5 and also of the blades on the flooding plate.

It is evident that when the shaft 11 is revolved, through the power pulley, the cam 14 will give to the bar 16 an oscillating movement, due to its engagement with the groove 15, and this bar, being connected to the flooding plate, through the medium of the vertical bar 9, will cause this plate to rock on its rod 5, causing the blades 7 to rise and fall alternately, and as each one rises, it will carry with it a quantity of the liquid chocolate and flood the under surfaces of the confectionery blanks that pass over it on the traveling belt 4. By means of this double action of the flooding plate, we are assured a constant supply of the liquid chocolate against the under surface of the blanks.

Having thus fully described our invention, what we claim and desire to secure by Letters Patent is:—

1. In a flooding device for chocolate coating machines, the combination of a traveling perforated belt adapted to carry the blanks to be coated, a liquid chocolate container, a flooding plate comprising two blades mounted on a shaft, said blades being inclined downwardly out of the horizontal and adapted to raise the liquid chocolate, a power shaft and means on the power shaft to convey an oscillating movement to the flooding plate.

2. In a flooding device for chocolate coating machines, the combination of an endless conveyer, adapted to carry the blanks to be coated, a liquid chocolate container located below said belt, a flooding plate in the container, said plate comprising a rod and a pair of blades, each of which blades is inclined downwardly from the horizontal, a power shaft, a cam on the end of the power shaft, an oscillating bar in engagement with the cam and a vertical bar connecting the oscillating bar and the flooding plate rod.

In testimony whereof we affix our signatures in presence of two witnesses.

THAMOS G. HOLLIS.
SAMUEL GIBNEY.

Witnesses:
CLARA E. YOUNG,
ED. A. KELLY.

---

Copies of this patent may be obtained for five cents each, by addressing the "Commissioner of Patents, Washington, D. C."